(12) United States Patent
Xiao et al.

(10) Patent No.: US 11,755,795 B2
(45) Date of Patent: Sep. 12, 2023

(54) DETECTING AND MITIGATING FLOW INSTABILITIES IN HYDROCARBON PRODUCTION WELLS

(71) Applicant: ExxonMobil Technology and Engineering Company, Spring, TX (US)

(72) Inventors: Feng Xiao, Spring, TX (US); Neeraj R. Dani, Houston, TX (US); Ted A. Long, Spring, TX (US); Justin A. Gantt, St. Johns (CA); Zachary H. Borden, Houston, TX (US); Amr El-Bakry, Houston, TX (US); Curtis J. Holub, Spring, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 1126 days.

(21) Appl. No.: 16/133,983

(22) Filed: Sep. 18, 2018

(65) Prior Publication Data

US 2019/0093455 A1   Mar. 28, 2019

Related U.S. Application Data

(60) Provisional application No. 62/562,015, filed on Sep. 22, 2017.

(51) Int. Cl.
| | |
|---|---|
| G06F 30/28 | (2020.01) |
| E21B 47/10 | (2012.01) |
| E21B 43/12 | (2006.01) |
| G06F 30/20 | (2020.01) |
| E21B 47/07 | (2012.01) |
| E21B 47/008 | (2012.01) |

(Continued)

(52) U.S. Cl.
CPC ............ *G06F 30/28* (2020.01); *E21B 41/00* (2013.01); *E21B 43/122* (2013.01);
(Continued)

(58) Field of Classification Search
CPC ............ E21B 2200/09; E21B 2200/20; E21B 2200/21; E21B 47/007; E21B 21/08;
(Continued)

(56) References Cited

U.S. PATENT DOCUMENTS

| | | | | |
|---|---|---|---|---|
| 6,823,296 B2* | 11/2004 | Rey-Fabret | ............ | G05B 17/02 703/2 |
| 7,640,149 B2* | 12/2009 | Rowan | ................... | G01V 11/00 703/10 |

(Continued)

OTHER PUBLICATIONS

Cao_2016 (Advanced Methods in Neural Networks-Based Sensitivity Analysis with their Application in Civil Engineering, 2016) (Year: 2016).*

(Continued)

*Primary Examiner* — Brian S Cook
(74) *Attorney, Agent, or Firm* — ExxonMobil Technology and Engineering Company—Law Department

(57) ABSTRACT

A method of detecting and mitigating flow instabilities, such as slugging, in hydrocarbon production wells. Real-time production data pertaining to each well is are retrieved. Using the production data, patterns of flow instability are identified therein. A numerical model of transient and thermal multiphase flow in each well is generated. Well test data is are retrieved from a database. The numerical model is calibrated using the well test data. Using the calibrated numerical model, a parametric study is performed to determine how input parameters affect at least one of stability and performance of the wells. Results of the parametric study are queried to determine a type of flow instability and to determine operating conditions to improve performance of the wells. An advisory is provided to a user to change operating conditions of one or more of the wells, to improve stability and/or performance of one or more of the wells.

6 Claims, 3 Drawing Sheets

(51) Int. Cl.
*E21B 41/00* (2006.01)
*E21B 47/06* (2012.01)
*G06F 111/10* (2020.01)

(52) U.S. Cl.
CPC .......... *E21B 47/008* (2020.05); *E21B 47/07* (2020.05); *E21B 47/10* (2013.01); *G06F 30/20* (2020.01); *E21B 47/06* (2013.01); *G06F 2111/10* (2020.01)

(58) Field of Classification Search
CPC ...... E21B 31/00; E21B 31/005; E21B 31/107; E21B 41/0092; E21B 43/122; E21B 43/16; E21B 44/00; E21B 44/04; E21B 44/06; E21B 44/08; E21B 47/006; E21B 47/008; E21B 47/06; E21B 47/09; E21B 47/26; E21B 49/00; E21B 49/003; E21B 49/087; E21B 49/0875; E21B 49/088; G06F 30/00; G06F 30/10; G06F 30/20; G06F 30/27; G06F 30/33; G06F 2111/04; G06F 2111/06; G06F 2111/16
USPC .......................................................... 703/10
See application file for complete search history.

(56) References Cited

U.S. PATENT DOCUMENTS

| | | | | |
|---|---|---|---|---|
| RE42,245 E * | 3/2011 | Thomas | ................. | E21B 43/20 702/13 |
| 8,244,509 B2 * | 8/2012 | Banerjee | ................. | E21B 49/00 703/9 |
| 8,280,635 B2 * | 10/2012 | Ella | ................. | G06Q 10/06 702/6 |
| 8,504,341 B2 * | 8/2013 | Cullick | ................. | E21B 43/00 703/10 |
| 10,087,721 B2 * | 10/2018 | Usadi | ................. | G06N 3/0427 |
| 10,359,523 B2 * | 7/2019 | Casey | ................. | G06T 17/05 |
| 10,401,808 B2 * | 9/2019 | Okoroafor | ................. | G05B 15/02 |
| 2002/0029883 A1 * | 3/2002 | Vinegar | ................. | E21B 43/123 166/250.03 |
| 2007/0032994 A1 * | 2/2007 | Kimminau | ................. | E21B 47/00 703/10 |
| 2014/0277752 A1 * | 9/2014 | Chang | ................. | E21B 44/00 700/275 |
| 2015/0148919 A1 * | 5/2015 | Watson | ................. | G05B 13/041 700/31 |
| 2016/0356125 A1 * | 12/2016 | Bello | ................. | E21B 43/14 |
| 2020/0133251 A1 * | 4/2020 | Rossi | ................. | F17D 5/06 |

OTHER PUBLICATIONS

Roos_2015 (Sensitivity Analysis for Bayesian Hierarchical Models, Bayesian Analysis (2015) 10, No. 2, pp. 321-349). (Year: 2015).*

Payaro_2009 (Hessian and concavity of mutual information, differential entropy, and entropy power in linear vector Gaussian channels, Mar. 11, 2009). (Year: 2009).*

* cited by examiner

DETECTING AND MITIGATING FLOW INSTABILITIES IN HYDROCARBON PRODUCTION WELLS

CROSS-REFERENCE TO RELATED APPLICATION

This application claims the benefit of U.S. Provisional Patent Application 62/562,015 filed Sep. 22, 2107 entitled DETECTING AND MITIGATING FLOW INSTABILITIES IN HYDROCARBON PRODUCTION WELLS, the entirety of which is incorporated by reference herein.

BACKGROUND

Field of Disclosure

The disclosure relates generally to gas lift wells, and more specifically, to the detection and mitigation of flow instabilities, such as slugging, in gas lift wells.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

Slugging is a type of unstable flow which can be observed in various well types including deviated wells with gas lift. Slugging appears as cyclic oscillations in the time-series data of wellhead pressure, downhole pressure, and casing pressure. FIG. 1 is a graph showing pressure as a function of time for a well. The top series 100 shows measurements of gaslift pressure 102 and casing pressure 104. The middle series 106 shows measurements of wellhead pressure 108 and flowline pressure 110. The bottom series 112 shows measurements of downhole pressure 114. Each of the pressure measurements display the cyclic oscillations characteristic of slugging. Severe slugging decreases production rate, upsets topsides/subsea facilities and poses potential risks for platform shut-down. Proper use of slugging detection and mitigation techniques can reduce deferred production, and can also assist with diagnosis of gas lift system dysfunction, either through malfunction of gas lift equipment or inappropriate gas lift system design. However, accurately modeling such complex well behaviors and distinguishing different slugging mechanisms requires a careful history matching procedure, and deploying of a slugging detection system to engineers and operators required data-driven surrogate models to simplify the procedure.

SUMMARY

The present disclosure provides a method of detecting and mitigating flow instabilities, such as slugging, in one or more hydrocarbon production wells, which may comprise a gas lift well. Real-time production data pertaining to each of the one or more hydrocarbon production wells is retrieved. Using the production data, patterns of flow instability are identified therein. A numerical model of transient and thermal multiphase flow in each of the one or more hydrocarbon production wells is generated. Well test data is retrieved from a database. The numerical model is calibrated using the well test data. Using the calibrated numerical model, a parametric study is performed to determine how input parameters affect at least one of stability and performance of the one or more hydrocarbon production wells. Results of the parametric study are queried to determine a type of flow instability and to determine operating conditions to improve performance of the one or more hydrocarbon production wells. An advisory is provided to a user to change operating conditions of one or more of the hydrocarbon production wells to improve stability and/or performance of one or more of the hydrocarbon production wells.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
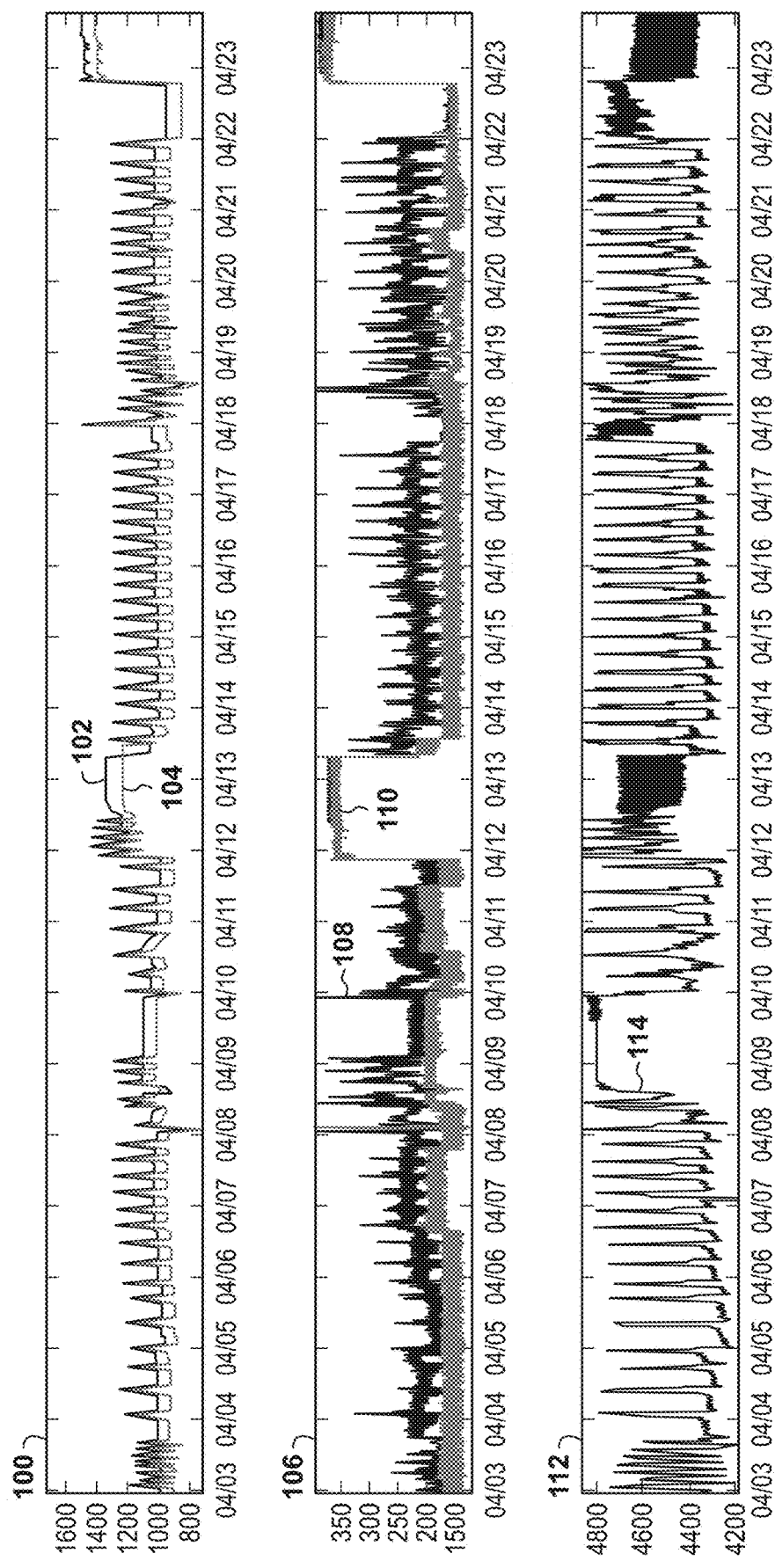
FIG. 1 is a chart showing various measured well pressures as a function of time.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"Exemplary" is used exclusively herein to mean "serving as an example, instance, or illustration." Any embodiment or aspect described herein as "exemplary" is not to be construed as preferred or advantageous over other embodiments.

The term "gas" is used interchangeably with "vapor," and is defined as a substance or mixture of substances in the gaseous state as distinguished from the liquid or solid state.

Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

As used herein, "natural gas" means a gaseous feedstock suitable for manufacturing LNG, where the feedstock is a methane-rich gas containing methane ($C_1$) as a major component. Natural gas may include gas obtained from a crude oil well (associated gas) or from a gas well (non-associated gas).

Aspects of the disclosure use high-fidelity transient flow modeling, careful history matching procedure and corresponding automation, to generate accurate data-driven surrogate models which can be used to guide engineers and operators to avoid poorly informed decision-making.

In addition to common modeling practices for gas lift, the high-fidelity transient flow model includes 1) a well model for the thermal transient that is critical for lift gas in an annulus, 2) a slugging module that adequately describes slugging behaviors (or other flow instability behavior) in a downhole well, and 3) a gas lift valve module that accurately describes both unloading the well and the operation of valves associated with the well. The history matching procedure takes into account production data uncertainty analysis, and calibrates fluid properties and tubular properties to match all the production history, such as average value of pressures and flowrates, as well as the amplitude and frequency of the cyclic oscillations of pressures and flowrates. The calibrated model is then used to generate an amount of data sufficient to create surrogate models that are used to improve operational efficiency.

Figure 2:
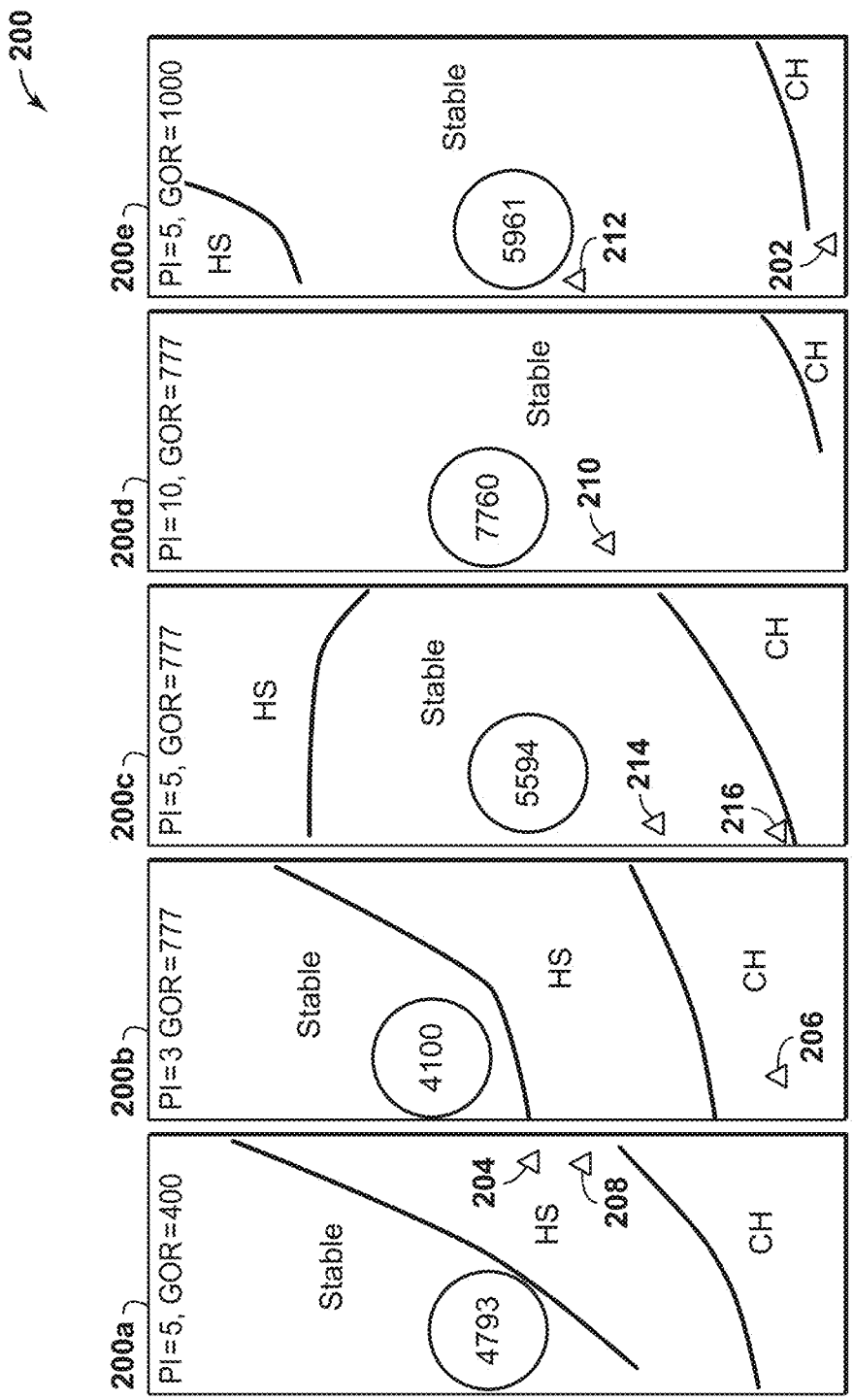
FIG. 2 is a schematic diagram of operational maps with stability constraints according to disclosed aspects.

The history matching procedure and surrogate model creation may be automated with expert logic to facilitate a specialty workflow and an online advisory system. The specialty workflow can be used by an engineer to create an engineering analysis, such as a set of operational maps, as shown in FIG. 2 at reference number 200, to diagnose the root cause of unstable flows and to identify a mitigation strategy. The first through fifth operational maps 200a, 200b, 200c, 200d, and 200e depict flow rates as a function of wellhead pressure for five different operating conditions as defined by well productivity index values and gas-to-oil ratios. Each operational map displays regions of stable operation, regions of casing heading conditions, and regions of hydrodynamic slugging. A series of well tests are shown as triangles, and are positioned in the respective operational map according to the well flow rate and pressure at each test. At the time of the first test 202 (in fifth operational map 200e), casing heading conditions were experienced. The gas lift rate and wellhead pressure were then increased by rerouting the wellhead to an intermediate pressure production separator, but at the time of the second test 204 (in first operational map 200a) the well exhibited hydrodynamic slugging. When the well was returned to the original separator, the well returned to casing heading conditions as shown by the position of the third test 206 (in second operational map 200b). Once again the gas lift rate and wellhead pressure were increased by rerouting the wellhead to an intermediate pressure production separator, and the fourth test 208 (in first operational map 200a) showed the well again exhibiting hydrodynamic slugging. The productivity index for the well was improved by bulkhead acidization, and wellhead pressure was lowered. The fifth test 210 (in fourth operational map 200d) showed the well was in a region of stable operation in fourth operational map 200d). The productivity index dropped by 50% due to fines migration and skin buildup, and the gas lift rate was increased in an attempt to maintain the original production rate. The sixth test 212 showed the well remained in a region of stable operation (in fifth operational map 200e). A decreased gas lift rate caused the seventh well test 214 to remain in a region of stable operation (in third operational map 200c). As the gas lift rate continued to decrease the eighth well test 216 showed the well was in a region of stable operation (in third operational map 200c).

The potential advantages of using an advisory system is that operational inefficiency can be substantially reduced or eliminated. While the operational maps as shown in FIG. 2 can display various states of the well under different operating conditions, high-fidelity maps can enable flow instability issues to be fixed directly instead of by guesswork or experimentation.

Figure 3:
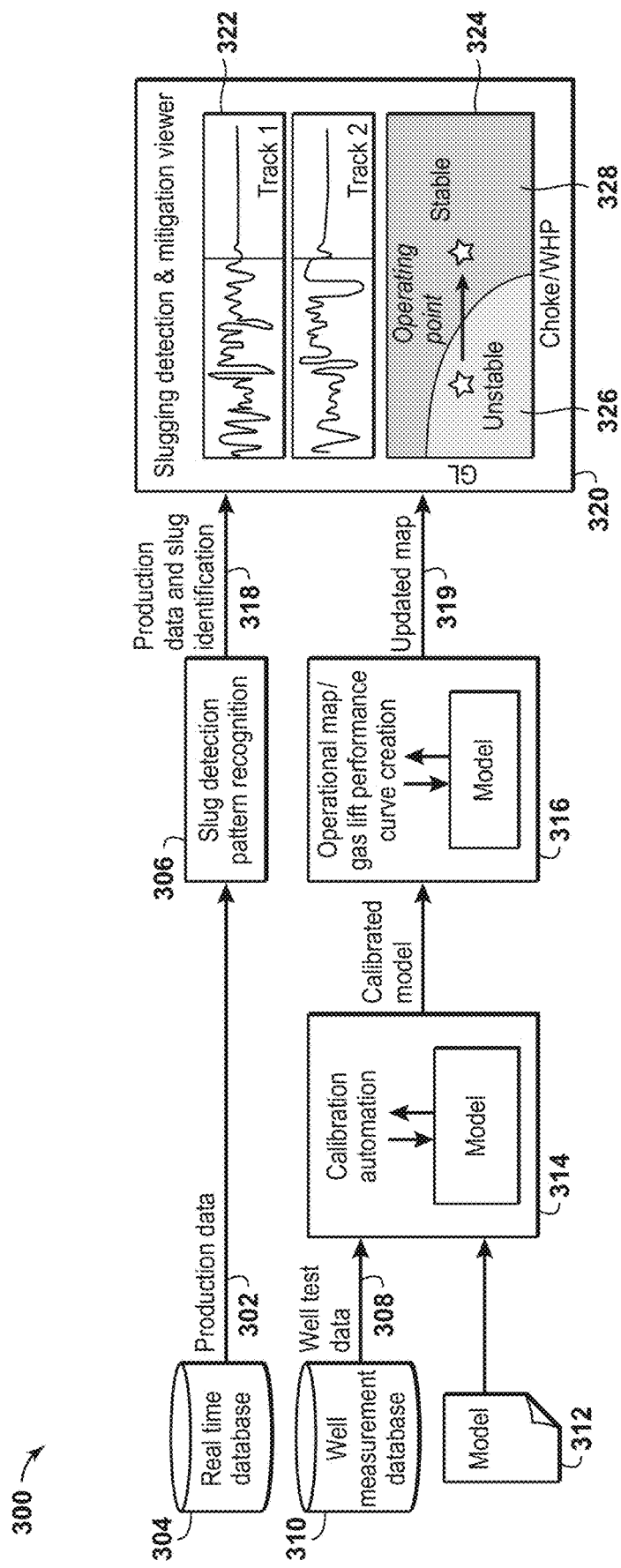
FIG. 3 is a schematic diagram of a system and method to detect and mitigate flow instabilities, such as slugging, according to disclosed aspects.

FIG. 3 shows the architecture of an online advisory system 300 according to an aspect of the disclosure. The online advisory system (FIG. 3) can calibrate the model automatically to the current operating conditions, and provide stability constraints, operation and workover recommendations to operators. Production data 302, retrieved from a process information system 304 and potentially including real-time pressure and temperature data, enables flow instability (such as slugging) detection pattern recognition at 306, so that patterns of flow instability may be identified. Well test data 308, retrieved from a database 310 that stores previously obtained information about the subsurface, is used to calibrate a transient and thermal flow model 312 as shown at 314. The calibrated model is used to generate an operational map and/or create a gas lift performance curve as shown at 316. The production data 318 and the updated map/curve 319 may then be used to provide information to user regarding flow instability and its mitigation. As shown in viewer 320, the user may view the production data to manually or automatically identify unstable flow situations at 322, while simultaneously displaying an operational map and/or performance curve at 324, which may graph gas lift as a function of choke and/or wellhead pressure, to demonstrate how the well pressure and/or performance may be moved from an unstable state 326 in which slugging or other unstable flow is occurring or may occur, to a stable state 328 in which slugging or other unstable flow is not occurring.

As the purpose of the disclosed aspects is to identify and mitigate flow instabilities (such as slugging situations) in real-time or near real-time, many of the steps of the disclosed processes and methods are most advantageously performed using one or more computers, processors, or other suitable machines (collectively identified herein as 'processor(s)'), which also include the necessary input/output devices, data buses, displays, data storage devices, and displays. The processor(s) may have a specific architecture designed for the disclosed processes/methods, or alternatively the processor(s) may be commonly available, general purpose processor(s).

Furthermore, the disclosed aspects include performing the disclosed methods on more than one well, and that the operating conditions of one or more wells may be modified such that the performance of one or more wells may be improved. Additionally, the disclosed aspects are intended to be used with or for the benefit of any type(s) of hydrocarbon production well.

The history matching procedures, which take place at 314 in FIG. 3, may include the following steps and/or features:
a. Calibrate the transient and thermal flow model (as shown at 312) with one or more recent valid well tests, as well as recent data, such as real-time pressure and temperature data.
b. Vertical lift performance calibration. This may include adjusting parameters relating to friction, such as tubing inner wall roughness, inner wall diameter, or adjusting a friction factor in a tuning module. Vertical lift performance calibration may also include adjusting parameters relating to gravity pressure drop, such as parameters relating to water density and/or oil API in a black oil model. Such parameter adjustment may be calibrated with fixed well head pressure and gas/oil/water rates, to match downhole pressure.
c. Inflow performance calibration. This may include adjusting a well productivity index to match gas/oil/water rates. The well productivity index may be defined as flow rate divided by drawdown, and in a preferred aspect may be defined as liquid flow rate divided by drawdown. Other inflow models may be used.
d. Oscillation amplitude calibration. This may include modifying one or more parameters of the flow instability model (which may be a slugging model), such as adjusting a delay constant.
e. Include parameters relating to well head choke opening. Another option is to extend one or more boundary conditions to redefine the system. For example, it may be desirable to include a separator (such as a test separator or a production separator) and define a boundary condition as an inlet or outlet of the separator.
f. Physics-based Interpretation. If oscillation amplitude is matched when the gas lift rate or the well head pressure is within an expected uncertainty region, the physics-based interpretation attempts to explain it in terms of data uncertainty and missing minor physics.
g. Fine tune the model parameters to match some or all of the well tests in the production history
h. Identify the general trends in all the well tests for liquid rate, downhole pressure, well head pressure, and their amplitude and frequency.
i. Fine tune the model parameters following Step 1 to match some or all of the trends with minimum error.

Creation of surrogate models for operational maps and online advisory, which may take place in 316 in FIG. 3, may include the following steps:
a. Run a parametric study over the operational ranges of the input parameters, perhaps with adaptable gridding, to cover a wide range of operating conditions for multi dimensions, such as well productivity index, gas/oil ratio, water cut and well head pressure, and gas lift design, for example.
b. Create data-driven surrogate models (e.g., neural network) based on the parametric study.
c. Optionally calibrating the surrogate model by adding production data to the training dataset if the surrogate model deviates from production data to a defined degree.
d. Use the transient and thermal flow model, or the surrogate model, to generate operational recommendations. Such recommendations may be provided using an automated workflow in an online system.

In another aspect, the disclosure provides the following:
A numerical model of transient (time varying) multiphase flow in a gas lifted well including flow in tubing, annulus, through one or more gas lift valves or orifices.

Model features may include:
a. heat transfer between the tubing and annulus and at least a simplified model of heat transfer to the surrounding environment (could be subsurface formation like rock, shale, etc. or water for subsea wells)
b. gas lift valve and/or orifice performance based on models or physical testing
c. directly calculating slugging (amplitude, period, shape) or employ a model that can be tuned to production data Model boundaries may include:
a. Inflow from reservoir
 i. Specified phase rate at some downhole location
 ii. a simple inflow model (such as a productivity index inflow model) that modifies the inflow rates as a function of downhole pressure, reservoir pressure, changing flow resistance in near well region, and/or changing phase split.
 iii. a more complex inflow model could be tied to a reservoir simulator
b. production outlet
 i. wellhead (commonly)
 ii. production separator with inclusion of flowline etc. between wellhead and separator
 iii. test separator or production separator with inclusion of flowline etc. between wellhead and separator
 iv. some other metered location in the system
c. gas lift inflow
 i. constant rate at inlet to casing annulus in wellhead
 ii. outlet of compressor including flowlines between compressor and wellhead
 iii. could include model of compressor response to changing input conditions and atmospheric conditions The model may be tuned to one or more well tests. The tuning may include modification of one or both of tubing friction and fluid properties to match total pressure drop and temperature variation between wellhead and some point downhole, which could be from a production log test or a downhole pressure/temperature gauge. The tuning may also include adjusting an inflow model to match the flow rate of each phase concurrent with the measured pressure drop in the well. When tuning to multiple well tests, the model may obtain a 'best fit' by minimizing some measure of error, through multivariable least squares methods, or other known methods.

The tuned model may be used to generate synthetic data from multiple operating conditions to identify stable and unstable parameter sets. Unstable sets may include hydrodynamic slugging, terrain based slugging, casing heading, multi-pointing, mistuned control loops, including selecting the system state in an efficient manner. Unstable sets may combine multiple interacting instabilities. Parameter sets may include well productivity index, skin, reservoir pressure, gas/oil ratio, water cut, gas lift rate, well head pressure/temperature, produced liquid rate, and the like.

A collection of operational maps may be generated from synthetic data with various stable and unstable combinations identified. Such operational maps may be displayed as collection of 2-dimensional maps when the number of parameters is small (i.e., less than 4). Such operational maps may be used to train a machine learning model when the number of parameters is large (equal to or greater than 4), and then the machine learning model can be used to generate specific maps as needed.

In an additional aspect, machine learning models are trained with synthetic data to create physics-aware artificial intelligence. Such training of the machine learning models may be accomplished with physics-based expectation and control points in the training dataset. The physics-based expectation may include the main flow regimes or flow mechanisms. The control points may include the boundaries between the main flow regimes or flow mechanisms. The calibration of machine learning model may be accomplished using actual production data when the data-model discrepancy is in certain small range. Fine-tuned machine learning model may be used to generate specific maps as needed.

In another aspect, model results (through collection of operational maps identifying types of flow) are combined with a system/workflow such as the gas lift optimization workflow known as the GLOW™ system (provided by ExxonMobil) which calculates stable states and optimal gas lift rates (including outside constraints) and monitors production data to identify flow instabilities. This combination of model results and the GLOW™ system tells a user if a well is in unstable flow, the type of unstable flow, and provides recommendation of system change to optimize production rates and/or alter the system state to more stable flow (better for the overall system).

The steps of the various methods and processes described herein are provided for illustrative purposes only and a particular step may not be required to perform the disclosed methodology. Moreover, the disclosed aspects may not describe all the steps that may be performed therein. The claims, and only the claims, define the disclosed system and methodology.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method of detecting and mitigating flow instabilities in one or more hydrocarbon production wells, the method comprising:
    retrieving real-time production data pertaining to each of the one or more hydrocarbon production wells;
    using the real-time production data, identifying patterns of flow instability within the real-time production data;
    generating a numerical model of transient and thermal multiphase flow in each of the one or more hydrocarbon production wells;
    retrieving well test data from a database;
    calibrating the numerical model using the well test data;
    using the calibrated numerical model, performing a parametric study to determine how input parameters affect at least one of a flow stability or a performance of the one or more hydrocarbon production wells, wherein results from the parametric study comprise stable parameter sets and unstable parameter sets for the one or more hydrocarbon production wells;
    generating a surrogate model based on the parametric study, wherein the surrogate model comprises a neural network model that is trained using a training dataset comprising the results from the parametric study comprising the stable parameter sets and the unstable parameter sets for the one or more hydrocarbon production wells, in combination with the real-time production data;
    using the surrogate model to determine a type of flow instability and to determine at least one change to at least one operating condition to improve the at least one of the flow stability or the performance of the one or more hydrocarbon production wells; and
    providing, to a user, an advisory to effect the at least one change to the at least one operating condition.

2. The method of claim 1, wherein the one or more hydrocarbon production wells comprise a gas lift well.

3. The method of claim 1, wherein calibrating the numerical model comprises applying a history matching procedure to the numerical model.

4. The method of claim 1, wherein providing the advisory to effect the at least one change to the at least one operating condition comprises at least one of:
    advising at least one change to at least one operating condition that will result in an increase in well production,
    advising at least one change to at least one operating condition that will result in an increase in well equipment life,
    advising at least one change to at least one operating condition that will result in an increase in facility equipment life,
    advising at least one change to at least one operating condition that will result in a reduction in well maintenance,
    advising at least one change to at least one operating condition that will result in a reduction in facility maintenance, or
    advising at least one change to at least one operating condition that will result in an increase in a well life,
of the one or more of the hydrocarbon production wells.

5. The method of claim 1, further comprising:
    generating at least one of an operational map or a gas lift performance curve based on the surrogate model; and
    using the at least one of the operational map or the gas lift performance curve, in combination with the surrogate model, to determine the type of flow instability and to determine the at least one change to the at least one operating condition.

6. The method of claim 5, further comprising:

displaying the at least one of the operational map or the gas lift performance curve on a display.

* * * * *